United States Patent [19]
Allgeier

[11] Patent Number: 5,987,497
[45] Date of Patent: Nov. 16, 1999

[54] SYSTEM AND METHOD FOR MANAGING THE CONFIGURATION OF DISTRIBUTED OBJECTS

[75] Inventor: Axel J. Allgeier, Parker, Colo.

[73] Assignee: J.D. Edwards World Source Company, Denver, Colo.

[21] Appl. No.: 08/774,513

[22] Filed: Dec. 30, 1996

[51] Int. Cl.⁶ .............................. G06F 15/16; H04L 12/00
[52] U.S. Cl. ..................... 709/201; 709/200; 709/203; 709/220; 709/224; 709/242; 707/10
[58] Field of Search ....................... 395/200.31–200.33, 395/200.36, 200.46–200.5; 709/200–203, 206, 220, 223–225, 236–239, 242–244; 707/200–204, 10

[56] References Cited

U.S. PATENT DOCUMENTS

| | | | |
|---|---|---|---|
| 5,049,873 | 9/1991 | Robins et al. | 340/825.06 |
| 5,146,561 | 9/1992 | Carey et al. | 709/200 |
| 5,542,047 | 7/1996 | Armstrong | 709/224 |
| 5,548,724 | 8/1996 | Akizawa et al. | 709/203 |
| 5,630,116 | 5/1997 | Takaya et al. | 707/201 |
| 5,774,660 | 6/1998 | Brendel et al. | 709/201 |
| 5,787,247 | 7/1998 | Norin et al. | 709/220 |
| 5,845,081 | 12/1998 | Rangarajan et al. | 709/224 |

OTHER PUBLICATIONS

"Microsoft Systems Management Server", Microsoft Corporation, Redmond, WA, 1994.
"Microsoft Systems Management Server for Windows NT Administrator's Guide", Document No. 66254, Microsoft Corporation, Redmond, WA, 1993–1995.
"Future–Proof Solutions", J.D. Edwards & Co., Denver, CO, 1995.
"Case Tools and 4GLs: The Enterprise Distinction", J.D. Edwards & Co., Denver, CO, 1995.
"OneWorld and the Event–Driven Model", J.D. Edwards & Co., Denver, CO, 1995.
"OneWorld Integrated Toolset Highlights", J.D. Edwards & Co., Denver, CO, 1995.

*Primary Examiner*—Zarni Maung
*Assistant Examiner*—Bharat Barot
*Attorney, Agent, or Firm*—Fenwick & West LLP

[57] ABSTRACT

A computer system includes at least one client computer and at least one server computer. An Object Configuration Manager allows a user to distribute and use objects, such as business logic, database tables, and batch applications. Additionally, through the Object Configuration Manager, access to objects can be limited to select users and applications. The Object Configuration Manager is implemented as a software application.

24 Claims, 13 Drawing Sheets

SYSTEM AND METHOD FOR MANAGING THE CONFIGURATION OF DISTRIBUTED OBJECTS

RELATED APPLICATIONS

The subject matter of this application is related to the subject matter of the commonly owned co-pending application Ser. No. 08/774,427, attorney docket number 2343, titled "System and Method for Retrieving Data" filed on Dec. 30, 1996, by Axel J. Allgeier, the contents of which are incorporated by reference as if fully disclosed herein. The subject matter of this application is also related to the subject matter of the commonly owned co-pending patent application, Ser. No. 08/743,201, attorney docket number 2347, entitled "Platform-Independent Programmable Batch Processing Engine" filed on Nov. 5, 1996 by Harry E. Shisler and Kevin Reitz, the contents of which are incorporated by reference as if fully disclosed herein.

FIELD OF THE INVENTION

This invention relates generally to client/server systems, and specifically to a client/server system and method that distributes objects such as business logic, batch applications and database tables among various client and server computers.

BACKGROUND OF THE INVENTION

Modern data processing systems are often implemented as distributed computing environments, such as "client/server" configurations in which a number of client computers, typically personal computers or workstations, communicate with one or more "server" computers and request server computers to perform processing tasks.

Distributing objects among client and server computers allows server computers to perform processing tasks that would otherwise have to be all performed by a client computer. Consequently, distributing objects generally improves system performance.

Known client/server systems use business logic objects, and distribute business logic objects between client and server computers. Business logic objects are programs that can be used and accessed by multiple applications to perform functions, such as retrieving data from files and undertaking table manipulations (i.e., updates, deletions, calculations, and the like). Other functions performed by business logic objects include calculating a price of an item and determining if a customer has enough credit remaining.

Unknown in the art is a client server system that allows users to distribute other types of objects, such as database tables and batch applications, to different or new locations. Batch applications are programs that normally process data without user interaction.

Distribution of objects such as batch applications and database tables results in greater system performance because more processing tasks may be assigned to computers that are more available or more efficient at processing those tasks. Additionally, such distribution reduces expensive system or application redesign when the number of server computers in the system is increased. This is because, if database tables and batch applications cannot be distributed to a new location, then these objects generally cannot be placed or created on a new server without reprogramming existing applications. If these objects can be distributed, they can be placed on new servers as needed without reprogramming existing applications.

Also unknown in the art is a system that allows a distribution of an object to take effect while applications are running. Specifically, if an application is open (executing) while the location of an object is changed, known systems require that the application be closed (terminated) and reopened in order for the application to receive data regarding the location change. Therefore, it is desirable to have a system that allows location changes to be known without having to close and reopen applications.

Furthermore, unknown in the art is a client/server system that allows objects to be accessed at different sites for different users and that allows access to objects to be limited to certain users or applications. Therefore, it is desirable to have a client/server system that allows for such user-specific distribution.

SUMMARY OF THE INVENTION

The present invention provides a distributed computing system and method for distributing objects, including business logic, database tables and batch applications. A distributed computing system according the present invention includes at least one client computer and at least one server computer.

A client computer according to the present invention includes middleware and an Object Configuration Manager. A user distributes and uses objects through the Object Configuration Manager, which is implemented as a software application in one aspect of the invention. At least one server computer has a database for the Object Configuration Manager, and this database stores data indicating the location of all distributable objects in the system.

In operation of the system, a user of the client computer gives the Object Configuration Manager a command to distribute an object or use a distributed object. In one embodiment, the types of commands are as follows:

1. The command may be a request that an object be acted upon (e.g. built/created, moved, removed, copied, etc.) at a particular location.
2. When an object exists on at least two computers and when an object can be accessed on at least one of these computers, the command may request that the location at which the object is accessed be switched from one of these computers to another of these computers.

In response to receiving the command, the Object Configuration Manager determines if the command affects other computers. If so, the Object Configuration Manager notifies affected computers of the changes resulting from the user's command. By notifying affected computers of the changes, the effected computers are constantly updated on events which impact them. Thus, the distribution takes effect immediately and does not require that computers be rebooted to receive notice of the distribution.

The Object Configuration Manager forwards the user's command to middleware on the client computer. The client middleware then sends the user's command to the appropriate server computer, which performs the requested function. Middleware on the client computer also sends a request to update the database for the Object Configuration Manager. The request is sent to the server having this database, and middleware on that server updates the database to reflect any changes in the location of an object.

The effect of allowing a user to perform the above described functions through the Object Configuration Manager is to create a seamless interface between the user and all of the computers in the system. Objects can be distributed and used at different locations while appearing to the user as if the objects existed on the user's computer. Such distribution enhances system performance because it allows for efficient allocation of resources. Additionally, when additional servers are added to a system according to the present invention, the system provides users with the opportunity to use the new server computers without reprogramming existing applications.

The features and advantages described in this specification are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

DETAILED DESCRIPTION OF THE PREFERRED EMBODIMENT

Figure 1:
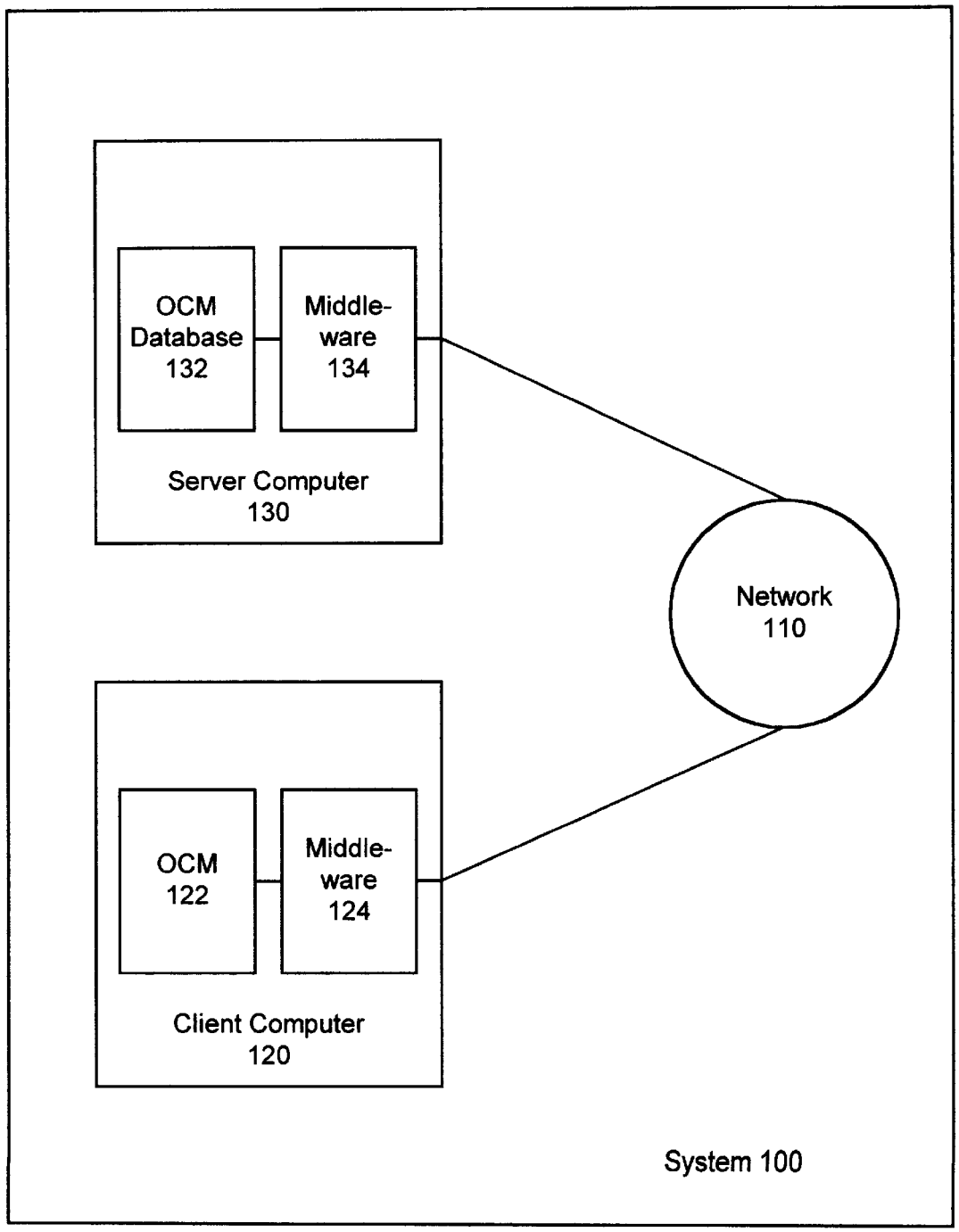
FIG. 1 is a block diagram of a distributed computing system according to the present invention.

FIG. 1 illustrates an example of a distributed computing system 100 according to the present invention. The distributed computing system 100 includes a client computer 120 and a server computer 130. The client and server computers 120, 130 are coupled together by a network 110. Distributed computing systems according to the present invention can vary as to the number of client and server computers, and the system 100 shown in FIG. 1 is merely an example of one such system. Additionally, a computer in the system 100 can function as both a client computer and a server computer.

The client computer 120 includes an object configuration manager (OCM) 122 and client middleware 124. Server computer 130 includes server middleware 134 and an OCM database 132 which stores information on all distributable objects in the network 110, including their location.

Middleware is a conventional type of software that provides a layer of a client/server architecture that resides between the client and the server and allows client and server computers running on different platforms and by different protocols to interface during run-time. For more information on middleware see, e.g., Alex Berson, *Client/Server Architecture* (2d ed. 1996); P. Bernstein, *Middleware: A model for Distributed System Services,* 39 COMMUNICATIONS OF THE ACM AT 86–98 (February 1996), the contents of which are hereby incorporated by reference as if fully set forth herein.

In a preferred embodiment, the OCM 122 is a software application created by known programming methods. Through the OCM 122, a user of a client computer 120 can instruct the system 100 to act upon an object at a select location. Objects include batch applications, business logic, or database tables, and ways in which the system 100 can act upon an object through the OCM 122 include building or creating an object, copying an object, and removing an object from a computer.

A user can also use the OCM 122 to switch the access location of an object (i.e., location at which an object can be accessed). The access location of an object is switched when an object is located on at least two computers and the location at which the object can be accessed is switched from one of these computers to another.

In one embodiment, a secondary, back-up access location can also be specified through the OCM 122. In this embodiment, if the object cannot be accessed at the primary location, it may be accessed at the secondary location. One method for accessing an object at a secondary location is disclosed in the patent application, Ser. No. 08/774,427, attorney docket number 2343, titled "System and Method for Retrieving Data" by Axel J. Allgeier, the contents of which are incorporated by reference as if fully disclosed herein.

In one embodiment, the access location can be changed for the whole system 100 or for just one user. Therefore, different users can have different access locations for the same object.

In yet another embodiment, through the OCM 122, a user can select the user or group of users that will be able to access an object, where those selected will be the only ones for which the object is available. A user can also make an object, such as a database table or a business logic object, available to be called upon by only select applications. In one embodiment, it is the user who creates an object that determines who or what will have access to the object and where the object will be accessed. Selective user and application access provides security advantages in that confidential objects can be installed and used on the system in a distributed manner without compromising their confidentiality.

Figure 2A:
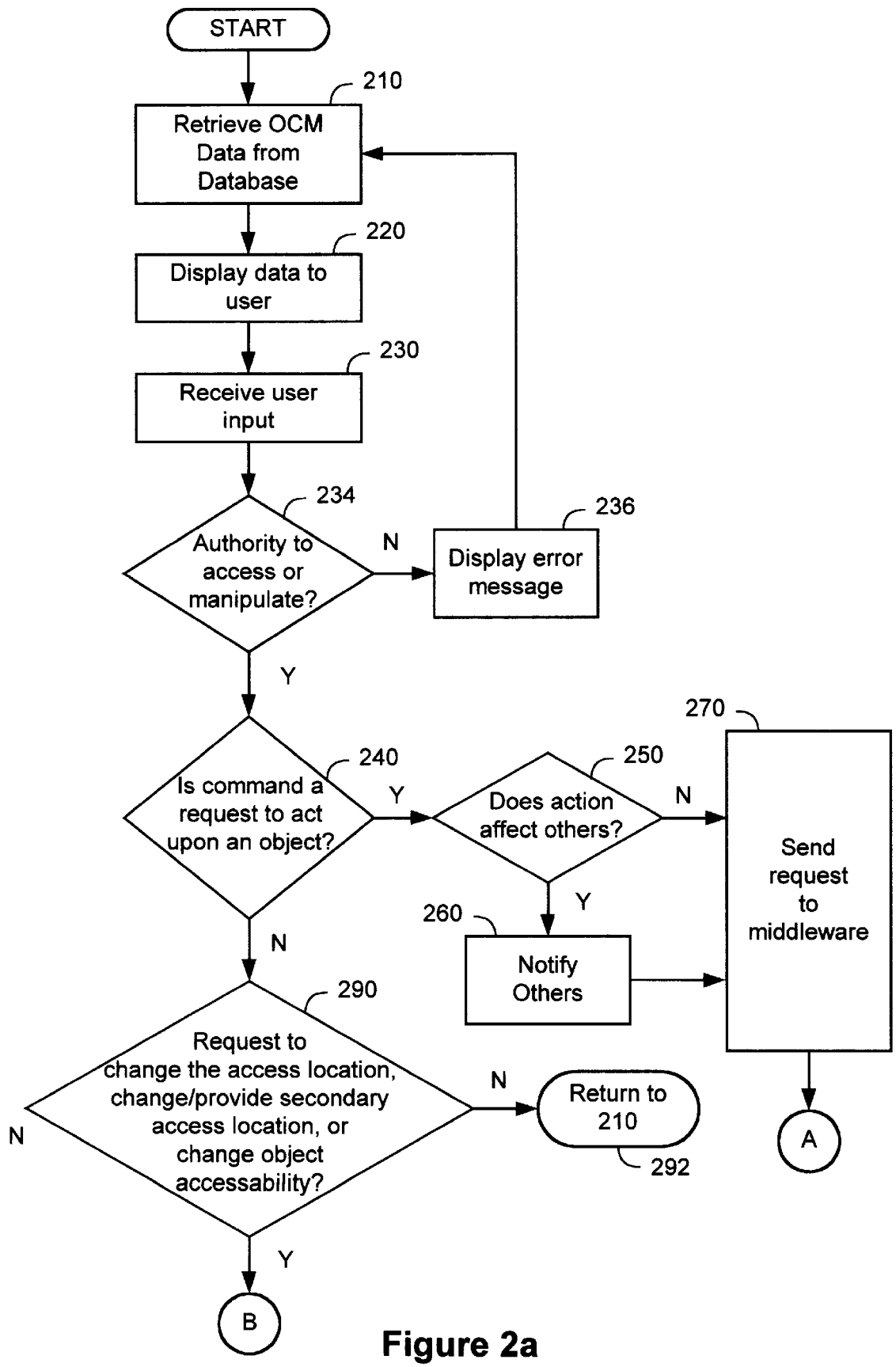
FIGS. 2a and 2b provide a flow chart of the operation of an Object Configuration Manager according to the present invention.
Figure 2B:
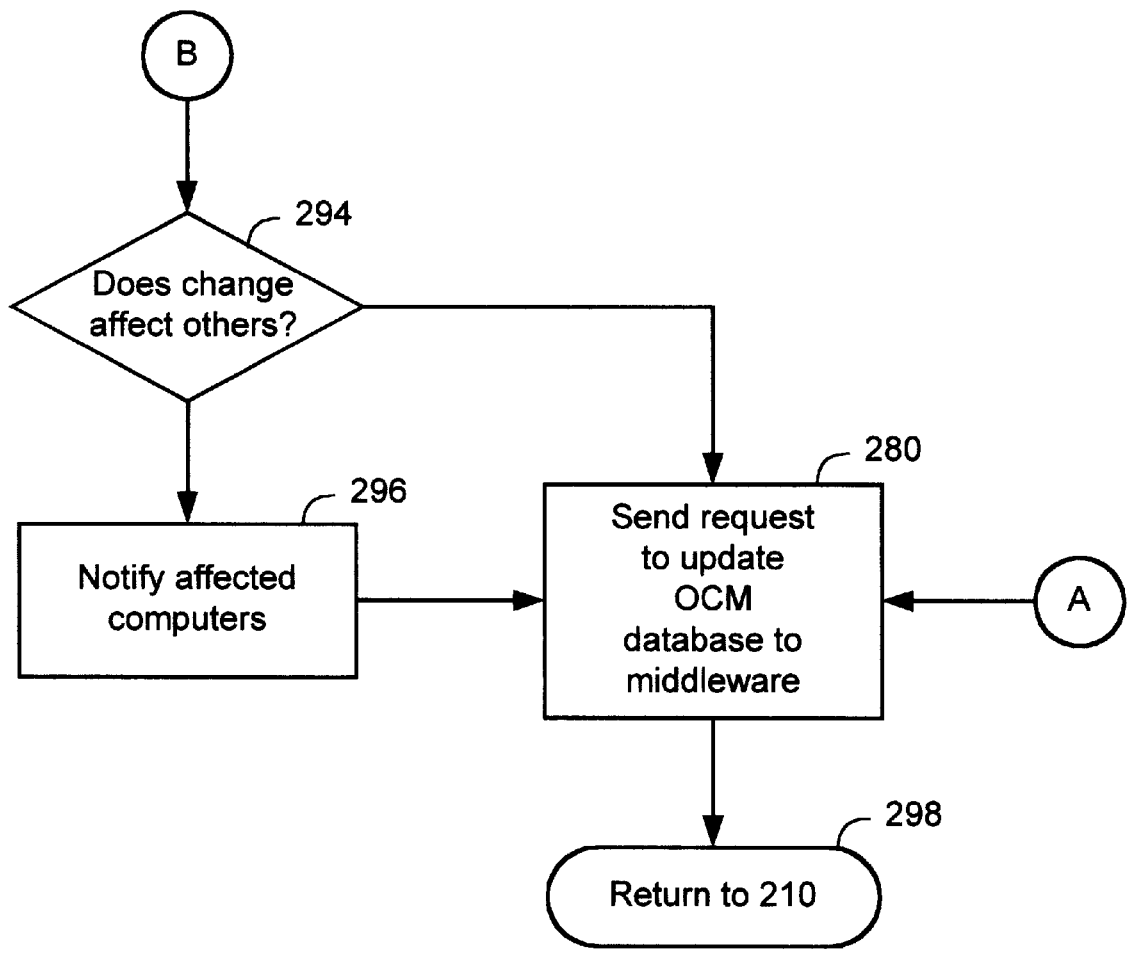

The flowchart of FIGS. 2a and 2b illustrates the operation of the OCM 122. In response to a user running the OCM application, the OCM 122 retrieves 210 from the OCM database data indicating the location of all distributable objects in the network. For each object, the OCM 122 also retrieves 210 data from the OCM database indicating the users or applications having access to the object and indicating the user(s) who can alter this data. After retrieving the location and access data, the OCM displays 220 the data on the computer screen of the user's client computer.

A user desiring to configure an object gives the OCM a command to act upon an object at a select location, to switch the access location of an object, to provide a secondary access location for an object, or to establish the availability of objects to users and applications. In response to the OCM 122 receiving 230 the user's command, the OCM 122 determines 234 (from the data retrieved from the OCM database) whether the user has authority to manipulate or access the object designated in the command. If the user does not have such authority, an error message is 236 displayed, and the OCM application starts over. If the user does have such authority, the OCM 122 ascertains 240 whether the user's command is a request to act upon an object. The ways in which an object can be acted upon depend on the type of object. Business logic objects, database tables and batch applications can be built on a computer, removed from a computer, or copied from one computer to another computer. Additionally, batch applications can be run on a computer. The above listed ways on which to act upon an object are not exclusive, but are merely examples of some of the ways that objects can be acted upon.

In response to the command being a request to act upon an object, the OCM 122 ascertains 250 whether the requested action affects other computers. An action affects another computer if the action affects the ability of a user or application associated with that computer to access an object. If the action affects other computers, the OCM 122 sends 260 a notification message notifying affected computers of the action so that, when the affected computers call on the object being acted upon, they will have the correct access location for the object. The OCM 122 sends 270 the request to perform the action to the client middleware 124. If the requested action does not affect other computers, the OCM 122 sends 270 the request to the client middleware 124 without notifying other computers of the action. Regardless of whether other computers are notified of the requested action, the OCM 122 sends 280 a request to the client middleware 124 to update the data in the OCM database 132. Data in the OCM database 132 is updated to indicate the location or locations of the object after the requested action has been performed.

In response to the command not being a request to act upon an object, the OCM 122 determines 290 whether the command is a request to switch the access location for an object, a request to add or change a secondary access location, or a request to change application or user access. If the command is not any of these, the OCM program starts 292 over and retrieves 210 OCM data from the OCM database 132.

A command to switch the access location for an object, a command to add or change a secondary access location, or a command to change object availability will indicate the users and applications to which the command applies. Therefore, if the command is any of these, the OCM 122 ascertains 294 from the command whether the requested action affects other computers. In response to the requested action affecting other computers, the OCM 122 sends a notification message notifying 296 the affected computers of the change and sends 280 a request to the client middleware 124 to update the OCM database 132 to reflect the change. In response to the requested action not affecting others, the OCM 122 sends 280 a request to update the OCM database to the client middleware 124 without notifying others of the change. After the request to update the OCM database is sent 280 to the client middleware 124, the OCM program starts 298 over and retrieves 210 data from the OCM database 132 unless the user terminates the OCM application.

Figure 3:
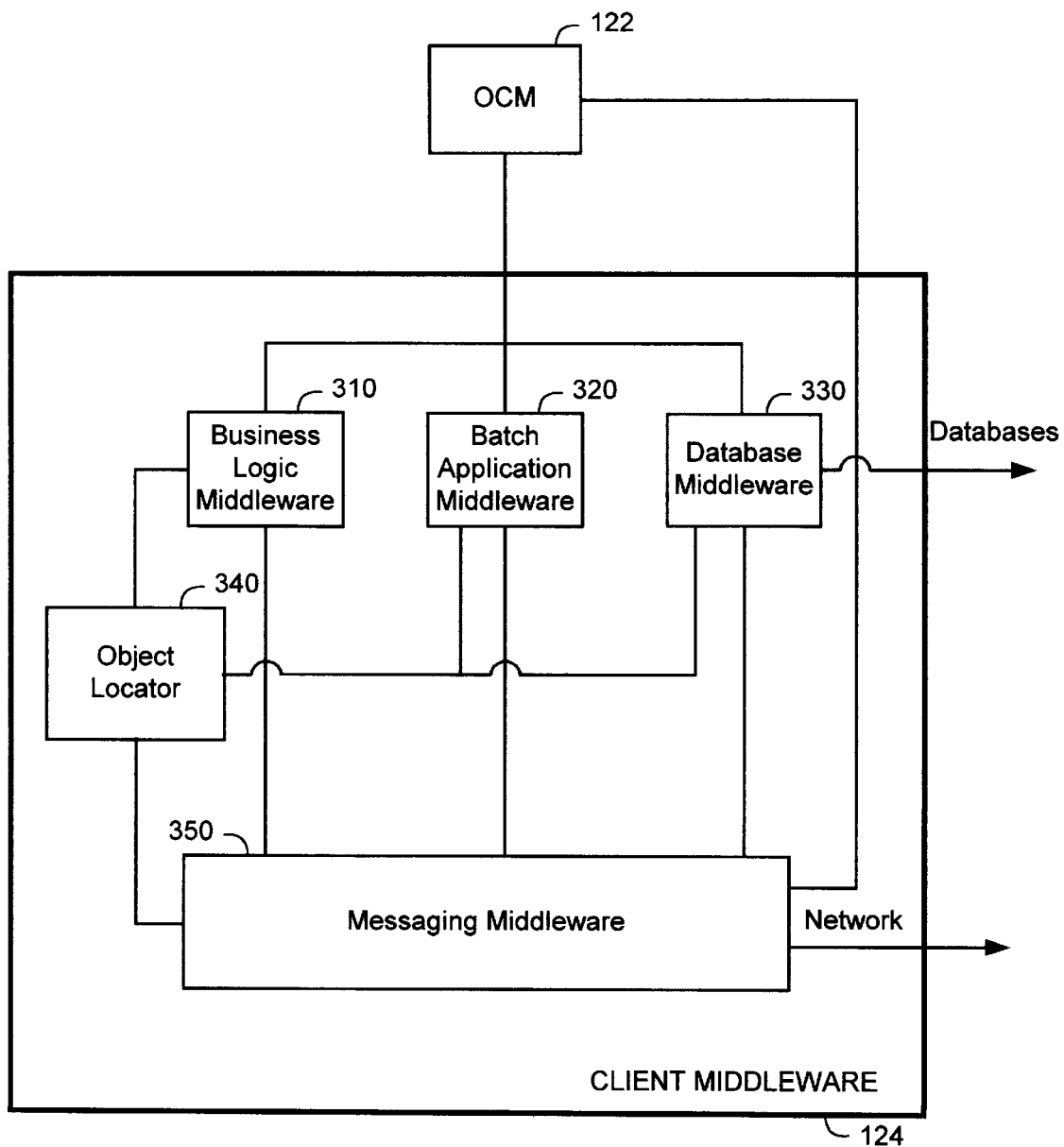
FIG. 3 is a block diagram of middleware on a client computer according to the present invention.

FIG. 3 illustrates a diagram of the client middleware 124, which includes business logic middleware 310, batch application middleware 320, database middleware 330, messaging middleware 350, and an object locator 340.

The business logic middleware 310 packages up requests to perform actions on business logic objects in response to a user giving the OCM 122 a command to act upon such business logic objects. Similarly, the batch application middleware 320 packages up requests to perform actions on batch applications in response to a user giving the OCM 122 a command to act upon such batch application objects. The database middleware 330 packages requests to update the OCM database 132 and requests to perform actions (e.g., copy, remove, create) on database tables in response to a user giving the OCM 122 a command to act with respect to a database table. All requests are packaged for transfer across the network 110 in a conventional manner.

The messaging middleware 350 interfaces with the network 110 using conventional hardware, such as standard TCP/IP sockets. The messaging middleware 350 sends out any of the above described packaged requests, via the network 110, to the appropriate server. The messaging middleware 350 also receives packages from the network 110. The received packages are forwarded to the middleware component (e.g., business logic middleware, batch application middleware, or database middleware) designated to process the information in the package.

The object locator 340, discussed in further detail below, stores the location of objects in the system 100. When the client computer 120 is started up, data from the OCM database 132 is cached in the object locator 340. While the client computer is running, the object locator 340 receives the above described notification messages from other computers for any object location changes that affect the client computer 120. The data carried in the notification messages is cached into the object locator 340, thereby allowing objects to be distributed dynamically throughout the OCM 122 since a user will not have to close out of an application to have the most updated data cached into the object locator 340.

When an application running on the client computer 120 calls for a particular object, the middleware associated with that object requests the location of the object from the object locator 340. The object locator 340 then locates the object and sends a response indicating the location to the requesting middleware.

Figure 4:
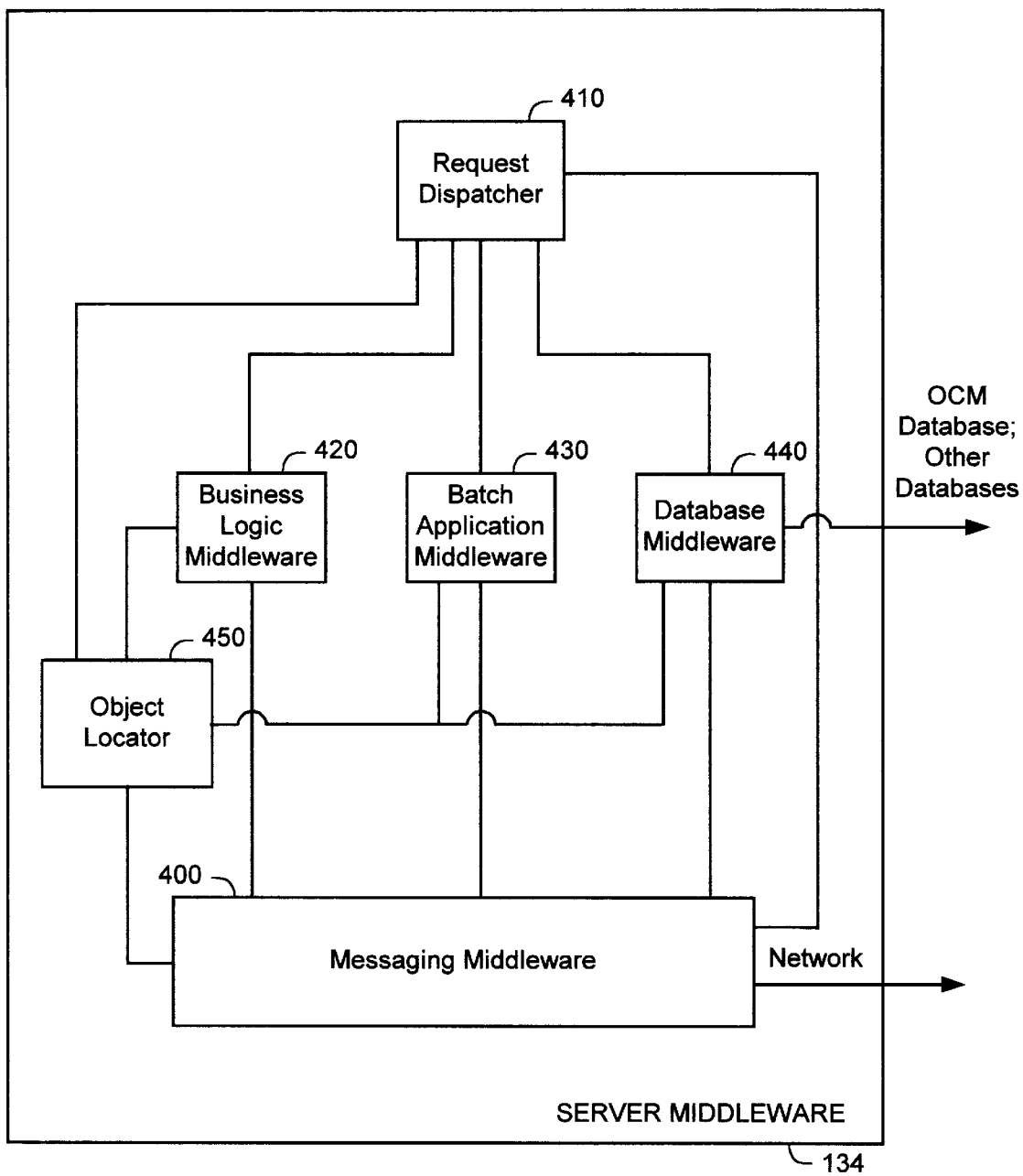
FIG. 4 is a block diagram of middleware on a server computer according to the present invention.

FIG. 4 illustrates the middleware on a server computer 130, which includes messaging middleware 400, request dispatcher middleware 410, business logic middleware 420, database middleware 440 and batch application middleware 430, and object locator 450. Messaging middleware 400 interfaces with the network 110 using conventional hardware, such as standard TCP/IP sockets. Via the network 110, messaging middleware 400 receives information from other computers and sends information to other computers. When messaging middleware 400 receives a request from a computer, it forwards the request to a request dispatcher 410, which determines what type of object the request pertains to and dispatches the request to the middleware corresponding to that object.

Figure 5:
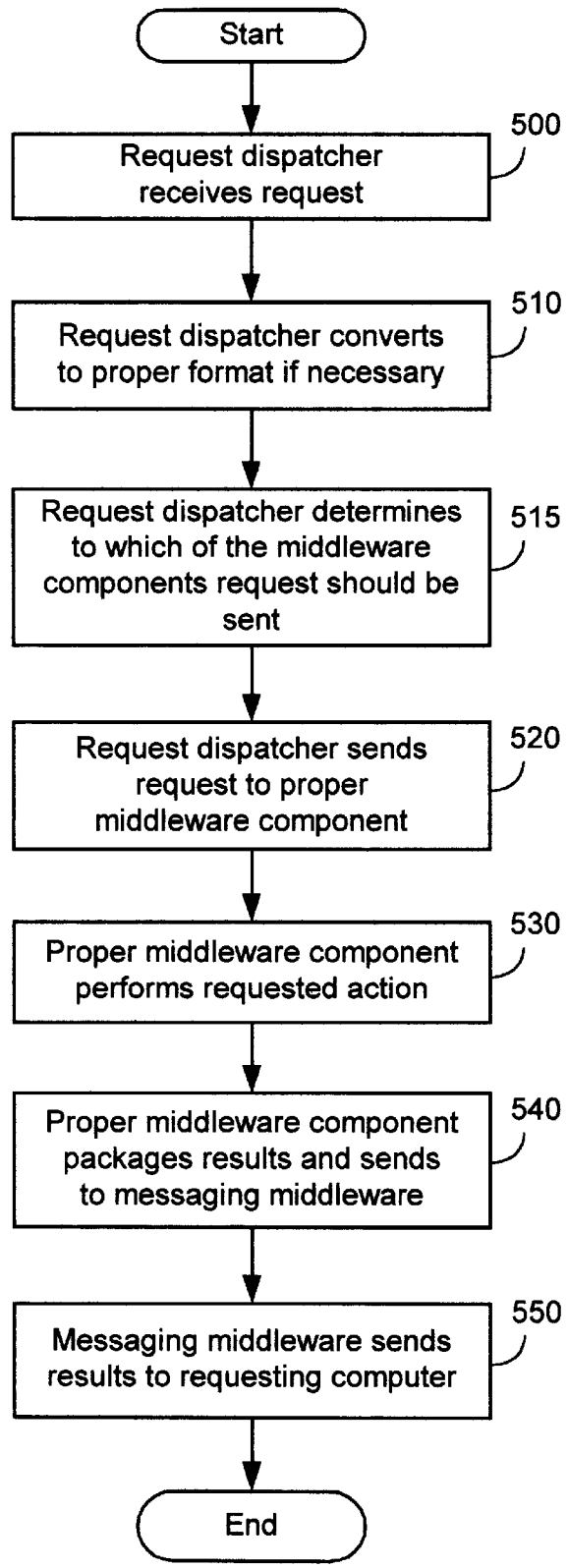
FIG. 5 is a flow chart of the operation of the server middleware according to the present invention.

FIG. 5 illustrates the operation of the request dispatcher middleware 410 and the general operations of the server middleware 134. The request dispatcher 410 receives 500 a request forwarded by the messaging middleware 400. The request dispatcher 410 then converts 510 (if necessary) the request into a format proper for the server and determines 515 to which of the middleware components on the server the request should be sent. After the determination, the request dispatcher 410 passes 520 the request to the proper middleware component. The proper middleware component performs 530 the requested action. Specifically, the business logic middleware 420 performs requested actions, such as build, copy, or remove, on business logic objects. The batch application middleware 430 performs the requested actions on the batch applications. Similarly, the database middleware 440 communicates with the OCM database 132, as well as any other database on the server 130, and performs the requested actions (e.g., build/create, copy, remove, and etc.) on database tables.

After the requested action has been performed, the middleware component performing the action packages 540 the results for transmission and forwards 540 them to the messaging middleware 400. The messaging middleware 400 sends 550 the results, via the network 110, to the requesting computer.

If the business logic middleware 420, the batch application middleware 430, or the database middleware 440 needs to locate an object (such as when an application calls for a database table or when the building of a batch application requires various business logic components to be found), the object locator 450 on the server computer locates the object and responds to the requesting middleware with the location of the object. As the case with an object locator 340 on the client computer 120, the object locator 450 is updated during run-time with object location changes by receiving notification messages from other computers. The notification messages are received at the messaging middleware 400 and passed to the request dispatcher 410, which sends the notification messages to the object locator 450.

FIGS. 6–10 illustrate the operations of the business logic middleware, batch application middleware, and database middleware on both the client and the server for carrying out user requests entered into the OCM 122.

Business Logic Object Middleware

Users create business logic objects at their individual client terminals by writing source code for the business logic object. The source code is stored as a disk file on the client computer.

Figure 6:
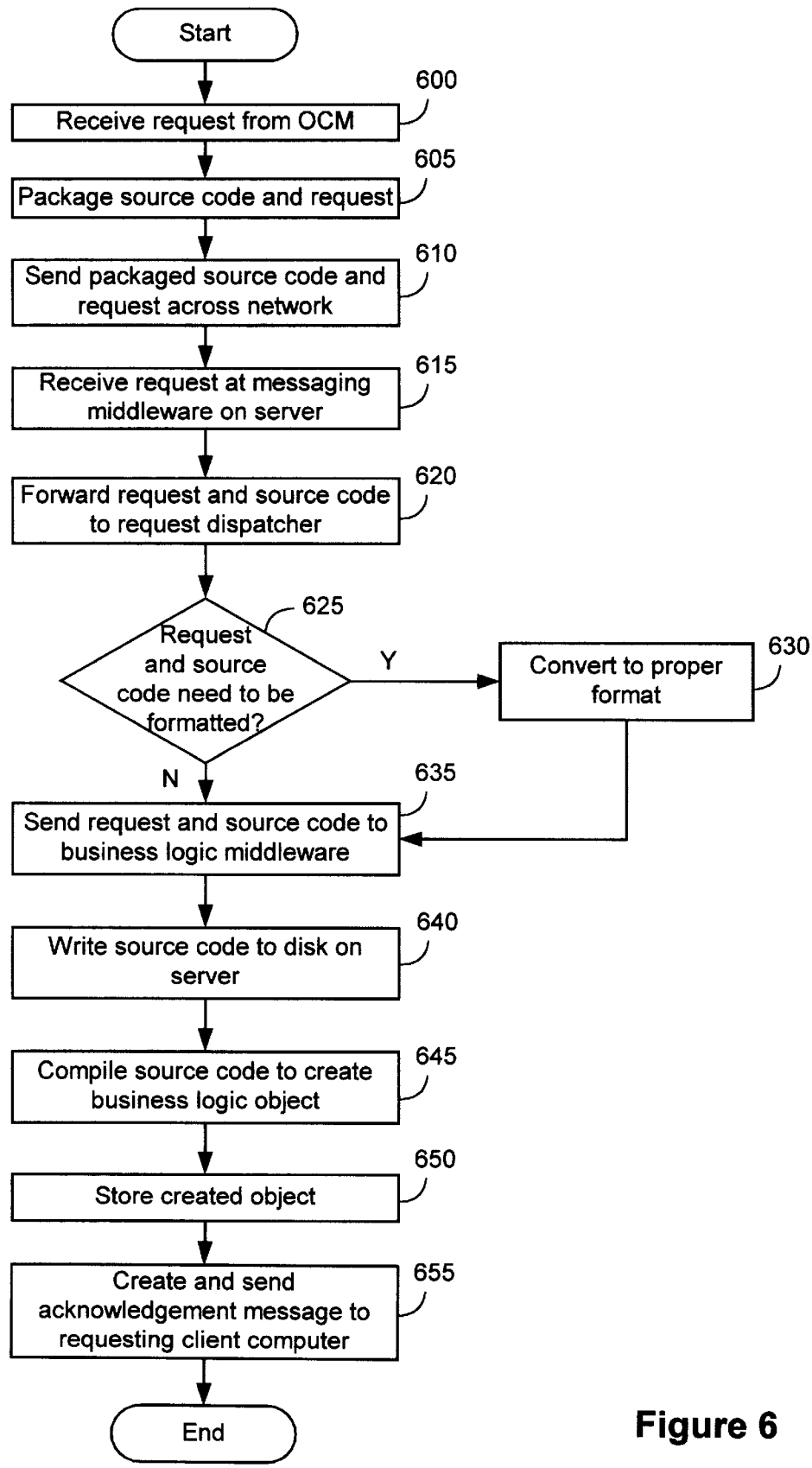
FIG. 6 is a flow chart of the operations of the client and server middleware for processing a request to create a business logic object.

FIG. 6 illustrates the operation of the business logic middleware on both the client and the server computers 120, 130 when a user requests to have a business logic object, for which source code exists on the client computer 120, built on a server computer 130.

The user enters the appropriate request into the OCM 122 and the business logic middleware on the client receives 600 the request from the OCM 122. Upon receiving the request, the business logic middleware packages 605 the request and the source code corresponding to the business logic object so that they may be transferred across the network 110. The packaged source code is then sent 610 across the network 110 by the messaging middleware 350 on the client 120 and received 615 at the messaging middleware 400 on the appropriate server 130.

The messaging middleware 400 on the server 130 forwards 620 the request and the source code to the request dispatcher 410, which determines 625 whether the request and the source code need to be formatted for the server and, if so, converts 630 them to a format proper for the server 130. The request dispatcher 410 sends 635 the request and the source code to the business logic middleware 310 on the server 130.

The business logic middleware 420 writes 640 the source code to a disk on the server 130 and compiles 645 the source code to create the requested business logic object. The business logic middleware 420 then stores 650 the created object on the server and creates 655 a message acknowledging that the business logic object has been successfully built. The acknowledgment message is sent 655, using the messaging middleware 400, to the requesting client computer 120.

Figure 7A:
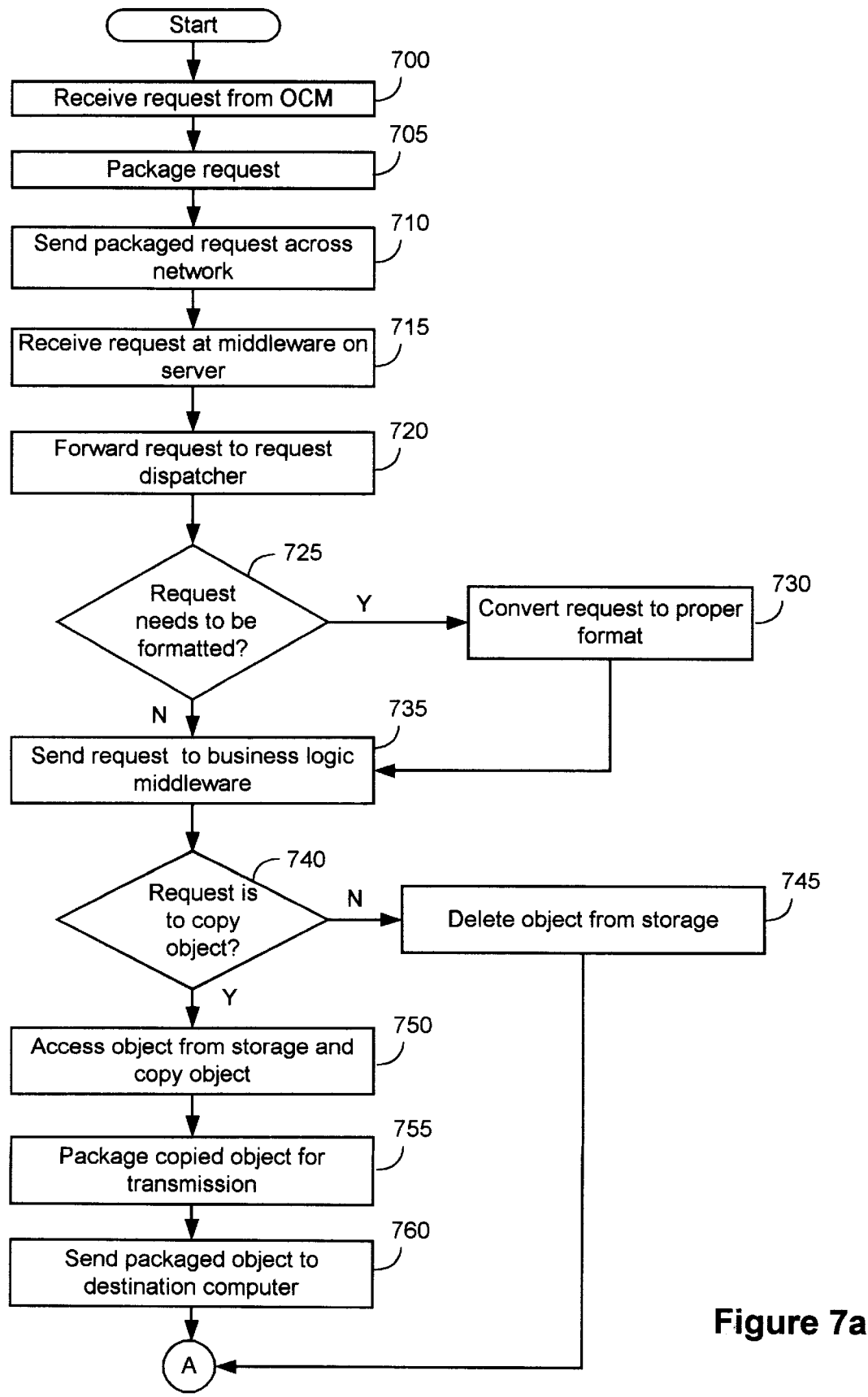
FIGS. 7a and 7b provide a flow chart of the operations of the client and server middleware for processing a request to delete or copy a business logic object.
Figure 7B:
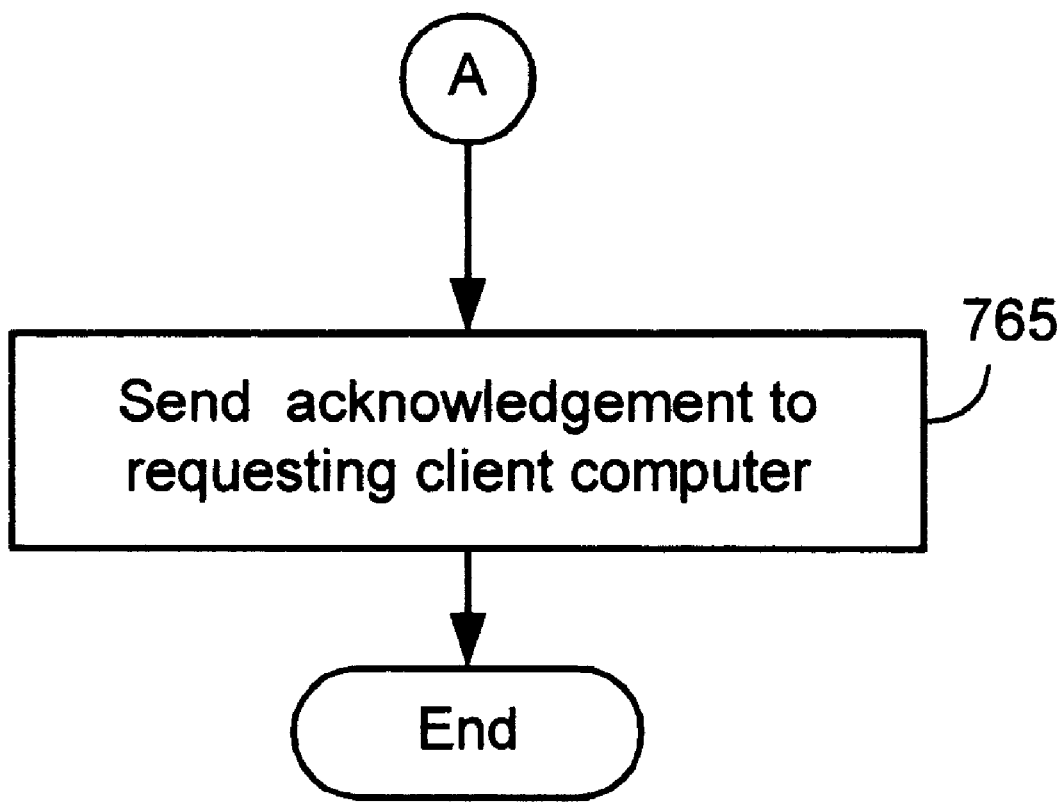

As discussed above, in addition to building a business logic object, a user may also copy a business logic object on a server computer 130 or delete a business logic object from a server computer 130. FIGS. 7a and 7b illustrate the operations of the business logic object middleware on both the client 120 and the server 130 for processing a request to copy or delete a business logic object.

The user enters the appropriate request in the OCM 122 and the business logic middleware on the client receives 700 the request from the OCM. Upon receiving the request, the business logic middleware 310 packages 705 the request so that the request may be transferred across the network 110. The packaged request is sent 710 across the network by the messaging middleware 350 on the client 120 and received 715 at the messaging middleware 400 on the appropriate server 130.

The messaging middleware 400 on the server 130 forwards 720 the request to the request dispatcher 410, which determines 725 if the request needs to converted to a format appropriate for the server 130 and which formats 730 the request if so needed. The request dispatcher 410 then sends 735 the request to the business logic middleware 420. The business logic middleware 420 determines 740 the nature of the request. If the request is to delete a business logic object, the business logic middleware 420 has the object deleted 745 from storage in a conventional manner. If the request is to copy a business logic object, the business logic middleware 420 accesses 750 the desired business logic object in storage and copies 750 the object in a conventional manner. The business logic middleware 420 then packages 755 the copied object for transmission across the network 100 and sends 760 it, via the messaging middleware 400, to the computer designated in the request (the business logic middleware on the designated computer stores the copied object). The business logic middleware 420 also sends 765 a message to the requesting client computer acknowledging successful completion of the requested action.

Batch Application Middleware

Users create batch applications at their individual client computers 126 by writing software code or combining business logic objects to create software code for the batch application. The code is stored as a disk file on the client computer 120.

Figure 8:
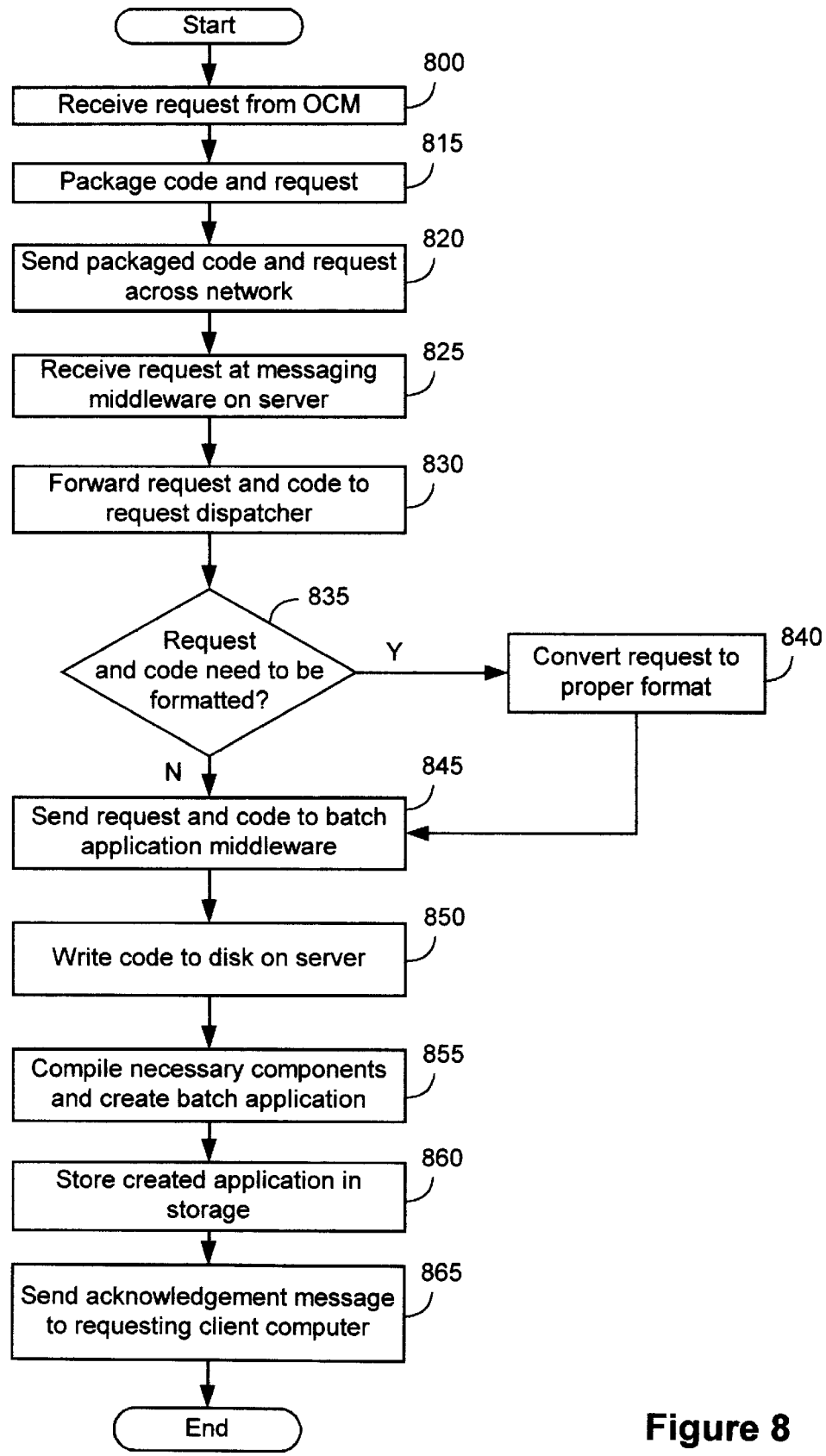
FIG. 8 is a flow chart of the operations of the client and server middleware for processing a request to create a batch application.

FIG. 8 illustrates the operation of the batch application middleware on both the client and the server computers 120, 130 when a user requests to have a batch application built on a server.

The user enters the appropriate request into the OCM 122 and the batch application middleware 320 on the client 120 receives 800 the request from the OCM 122. Upon receiving the request, the batch application middleware 320 packages 815 the request and any code corresponding to the batch application so that they may be transferred across the network. The packaged code and request are then sent 820 across the network 110 by the client messaging middleware 350 and received 825 by the messaging middleware 400 on the appropriate server 130.

The messaging middleware 400 on the server 130 forwards 830 the code and the request to the request dispatcher 410. The request dispatcher 410 determines 835 whether the code and the request need to be formatted and, if so, converts 840 them to a format appropriate for the server 130. The request dispatcher 410 then sends 845 the request and the code to the batch application middleware 430.

The batch application middleware 430 on the server 130 writes 850 the code to a disk on the server 130. Then, the necessary parts of the code are compiled 855 and the batch application is built 855. The built batch application is stored 860 in storage, and a message acknowledging successful assembly of the batch application is sent 865 (using the messaging middleware 400) to the requesting client computer 120.

Batch applications can also be deleted from the memory of a server 130 or copied on a server 130 for transfer to another computer. The methods of performing these functions are the same as those illustrated in FIGS. 7a and 7b and described above, except that the batch application middleware performs the functions described as being performed by the business logic middleware.

Figure 9:
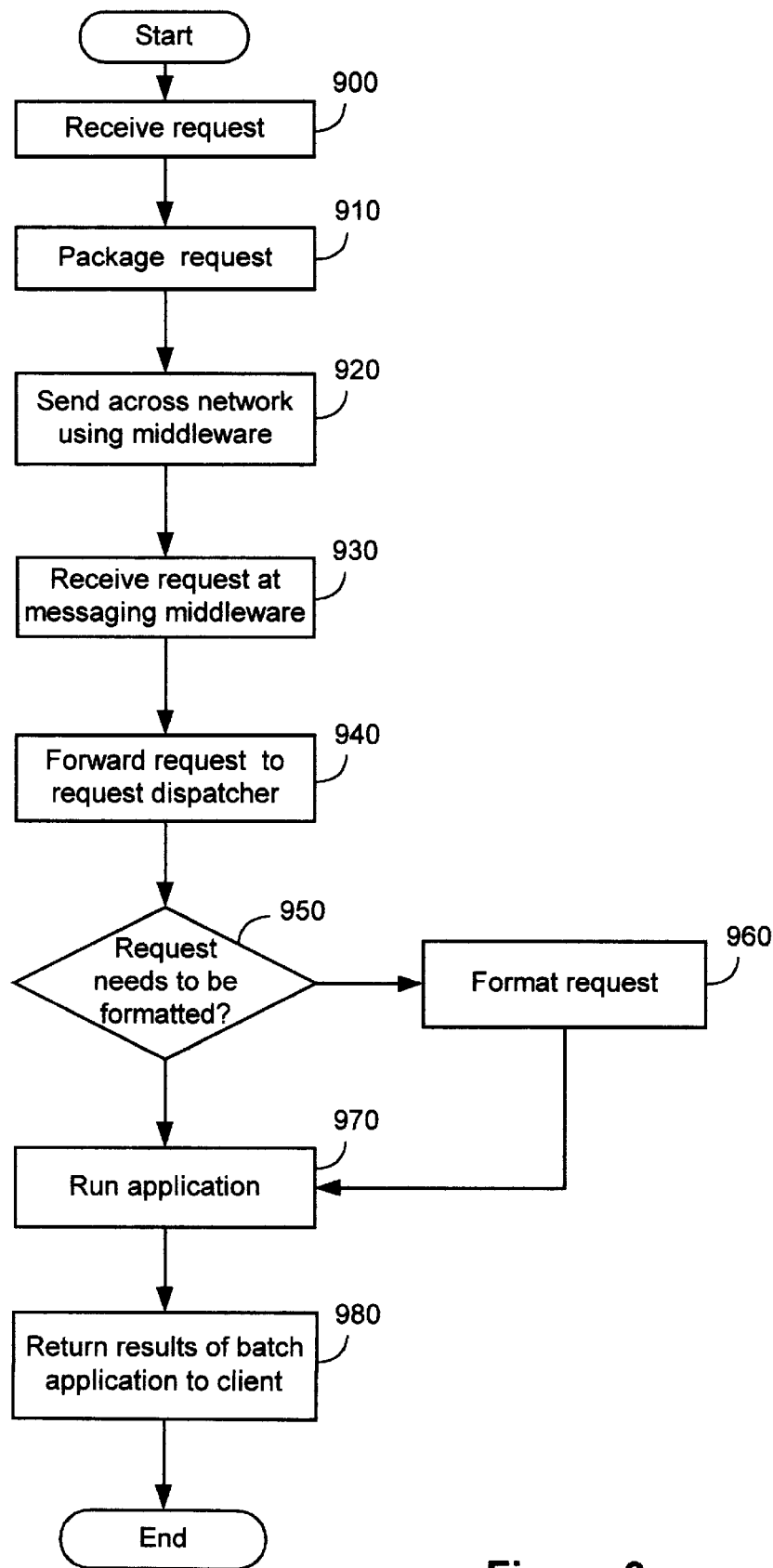
FIG. 9 is a flow chart of the operations of the client and server middleware for processing a request to run a batch application.

A user may instruct the OCM 122 to run a batch application that is located on a server computer 130. FIG. 9 illustrates the operations of the batch application middleware on both the client 120 and the server 130 for processing such an instruction. The batch application middleware 320 on the client 120 receives 900 the request to run a batch application from the OCM 122 and packages 910 the request so that it can be transmitted across the network 110. The messaging middleware 350 on the client 120 sends 920 the packaged request, via the network 110, to the messaging middleware 400 of the appropriate server 130. The messaging middleware 400 receives 930 the request and forwards 940 it to the request dispatcher 410, which determines 950 if the request needs to be formatted for the server. If so, the request dispatcher 410 converts 960 the request to the proper format. The request dispatcher 410 sends the request to the batch application middleware 430, which has the requested batch application run 970 on the server in accordance with parameters identified in the request. In one embodiment, the batch application is run by the batch engine described in the commonly owned co-pending patent application, Ser. No. 08/743,201, attorney docket number 2347, entitled "Platform-Independent Programmable Batch Processing Engine" filed on Nov. 5, 1996 by Harry E. Shisler and Kevin Reitz, the contents of which are incorporated by reference as if fully disclosed herein. The results of running the batch application are then returned 980, via the messaging middleware 400, to the requesting client computer.

Database Middleware

Figure 10:
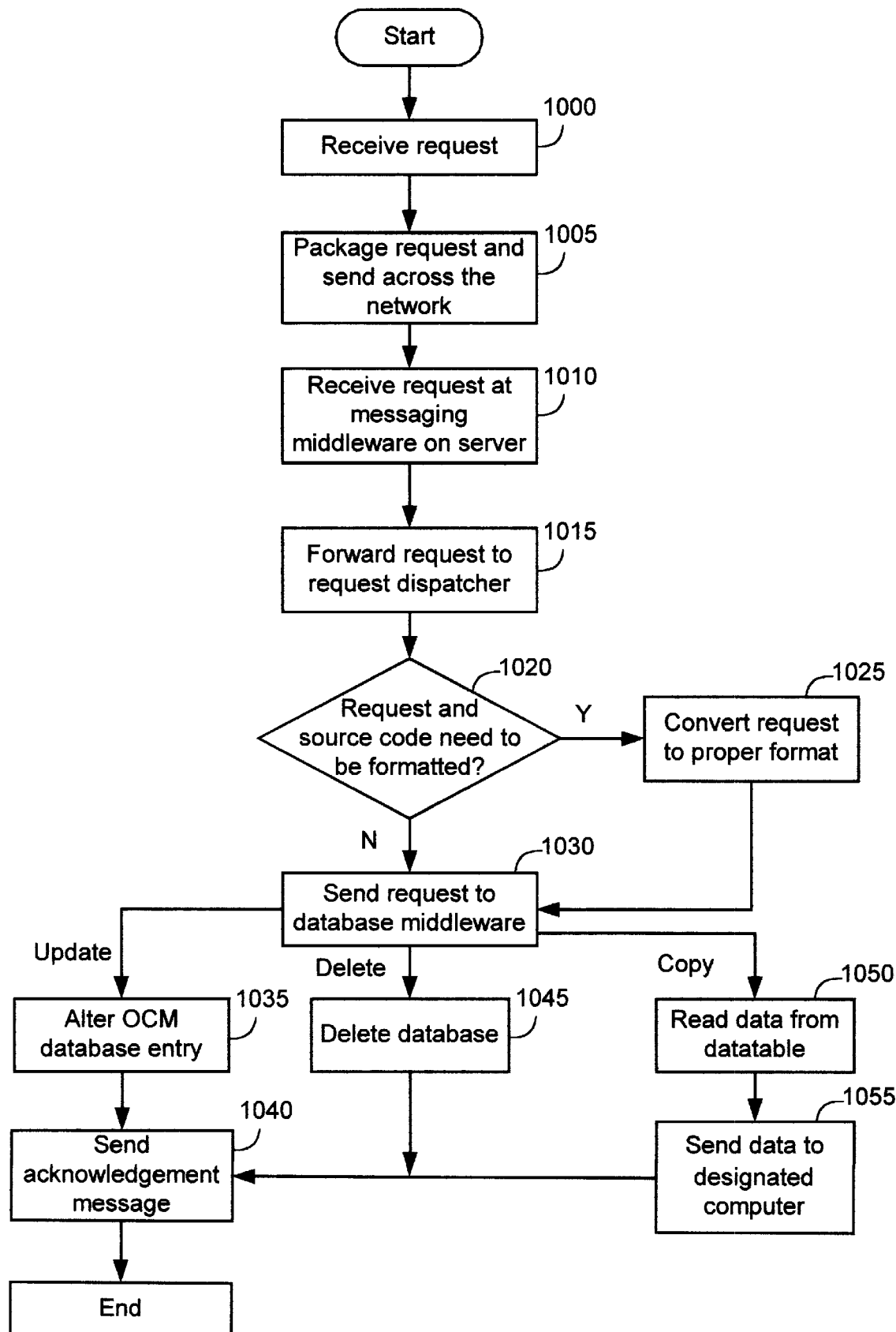
FIG. 10 is a flow chart of the operations of the client and server computer for processing a request to update or act upon a database table.

FIG. 10 illustrates operations of the database middleware. The database middleware 330 on the client computer 120 receives 1000 a request from the OCM 122. The database middleware 330 packages 1005 the request, and the messaging middleware 350 sends 1005 the request, via the network 110, to a server 130 designated in the request (if the request is one to update the OCM database 132, the request is sent to the server 130 having the OCM database 132). The request is received 1010 at the messaging middleware 400 of the server 130 which forwards 1015 the request to the request dispatcher 410. The request dispatcher 410 determines 1020 whether the request needs to be formatted. If so, the request dispatcher 410 converts 1025 the request to a proper format.

The request is sent 1030 to the server database middleware 440, which determines the type of the request. If the request is one to update the OCM database 132, the database middleware 440 updates 1035 the OCM database 132. As indicated in FIG. 2, a request to update the OCM database 132 will be sent to the database middleware 440 when there has been a change in user or application access to an object, when an object is acted upon, or when the primary or secondary access location of an object is switched. For instance, in response to the request being one to switch the access location of a database table, the database middleware alters the OCM database 132 so that the OCM database 132 indicates that the subject data table should be accessed at the location specified in the request. No data are copied when the access location is changed, but the OCM database 132 is altered to indicate the new access location.

If the database middleware 440 receives a request to delete a database, the database middleware 440 deletes 1045 the database from storage. If the request is to copy actual data from a database table to another computer, the database middleware 440 reads 1050 the data to be copied from the database table, and copies the data. The messaging middleware then sends 1055 the data to the computer designated in the request. The database middleware 440 on the computer receiving the data either stores the data in an existing database table or creates a database table from the received data, depending on whether an appropriate database table for the data exists on the computer receiving the data.

After the requested action has been performed, the database middleware 440 creates a message acknowledging completion of the request, and the messaging middleware 400 sends 1040 the acknowledgment message.

As indicated in FIGS. 3 and 4, the database middleware communicates directly with storage mediums storing database tables. Additionally, the database middleware has dynamic SQL capabilities, such as those in Microsoft Corporation's ODBC or Oracle Corporation's Call Interface.

Object Locator

Figure 11:
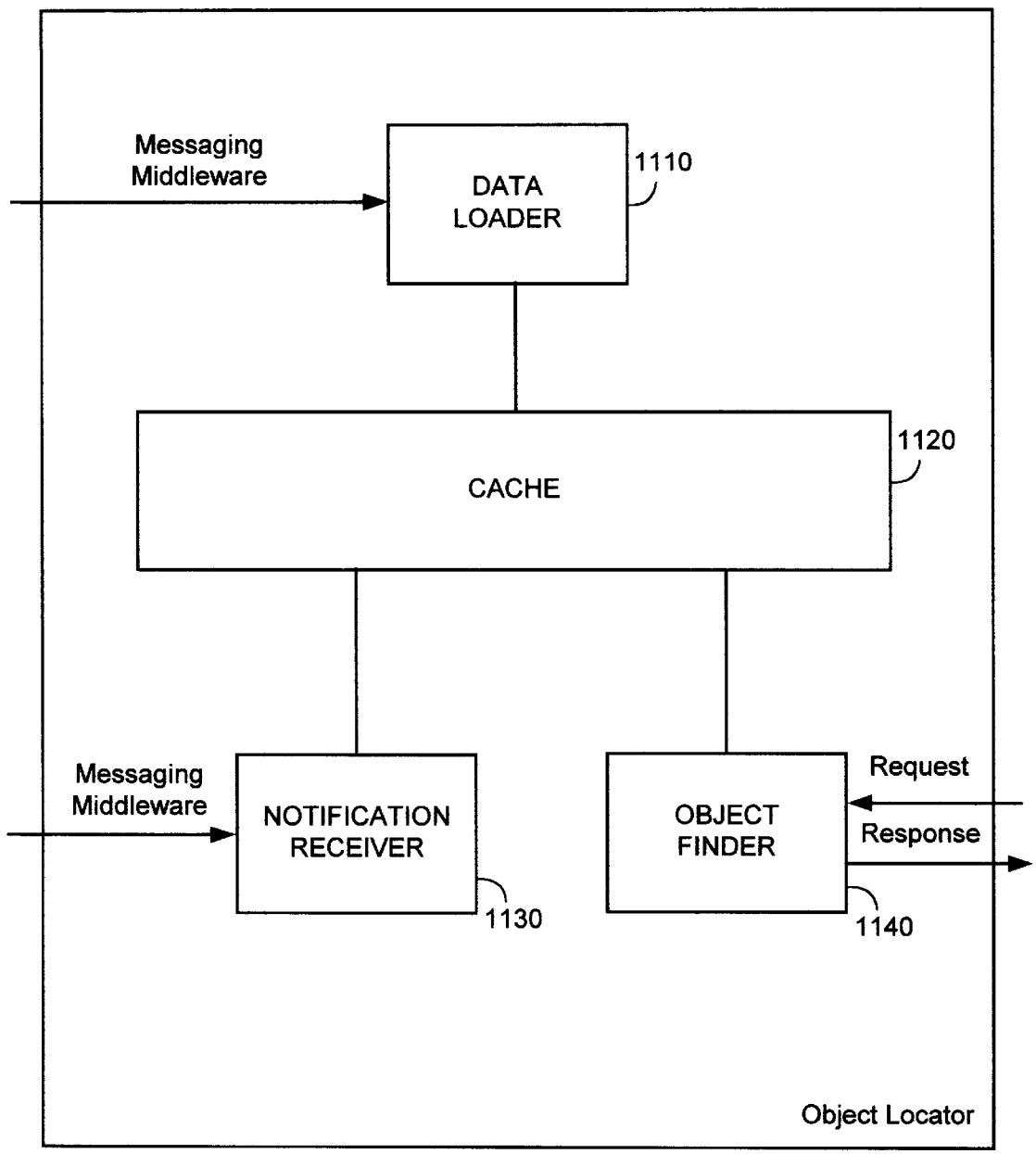
FIG. 11 is a block diagram of an object locator according to the present invention.

FIG. 11 illustrates a block diagram of an object locator. The object locators 340, 350 in both the client and server computers 120, 130 have the elements illustrated in FIG. 11.

A data loader 1110, which is a conventional interface, communicates with the database middleware to receive data from the OCM database 132. These data, received at the start up time of the host computer on which the object locator exists, indicate the location of objects in the system 100. The data also indicate which users and applications can access an object. The data loader 1110 stores this information in a conventional cache 1120. In one embodiment, the data received by the data loader 1110 also indicates whether an object has primary and secondary access locations, where the object can be accessed at the secondary location if the object cannot be found at the primary location.

A notification receiver 1130, which is implemented as an application program interface (API), communicates with the messaging middleware to receive notification messages indicating object location and access changes while the host computer is running. The notification receiver 1130 stores the updates in the cache 1120.

An object finder 1140, which is a conventional implementation of a binary search tree, receives requests from the business logic, batch application or database middleware to retrieve the location at which an object can be accessed. The object finder 1140 also retrieves the access location of the object from the cache 1120 and sends the information to the middleware that requested it. If the object can be accessed at a secondary location, the object finder 1140 also retrieves the secondary access location.

The object finder 1140 also retrieves information stored in cache 1120 in association with the location of an object.

Such information includes the data on which of users or applications can access an object. In response to receiving this data, the requesting middleware determines if the user or application has access to an object before proceeding to retrieve it. If the user or application calling an object does not have access to the object, an error message will be displayed at the user's terminal.

From the above description, it is apparent that the invention disclosed herein provides a novel and advantageous system for distributing objects using an Object Configuration Manager. The foregoing discussion discloses and describes merely exemplary methods and embodiments of the present invention.

As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A method for managing the configuration of distributed objects in a computer network having a plurality of nodes, the method comprising:

maintaining object configuration information on the nodes, said object configuration information defining object accessibility and object locations;

receiving a request to perform an action with respect to one of the objects;

determining whether the action may affect a set of the nodes including affecting an ability of said set of nodes to access the one object or affecting a location at which said set of nodes accesses the one object;

in response to determining that the action may affect said set of nodes, notifying said set of affected nodes with a notification message indicating changes to be made to said object configuration information resulting from the action;

changing said object configuration information maintained on said set of affected nodes for the one object in accordance with said notification message; and performing the action with respect to the one object;

wherein said object configuration information is updated dynamically at said set of affected nodes to reconfigure the one object in the computer network.

2. The method of claim 1, wherein the object is a batch application.

3. The method of claim 1, wherein the object is a database table.

4. The method of claim 1, wherein the object is business logic.

5. The method of claim 1, wherein performing the action comprises running a batch application.

6. The method of claim 1, wherein performing the action comprises making a copy of a batch application at one node of said set of affected nodes and sending the copy to another node of said set of affected nodes in the computer network.

7. The method of claim 1, wherein performing the action comprises deleting a batch application.

8. The method of claim 1, wherein performing the action comprises the step of altering a database entry indicating a location in the computer network where a batch application can be located.

9. The method of claim 1, wherein performing the action comprises the step of making a copy of a database table at one node of aid set of affected nodes and sending the copy to another node of said set of affected nodes in the computer system.

10. The method of claim 1, wherein performing the action comprises the step of deleting a database table.

11. The method of claim 1, wherein performing the action comprises the step of altering a database entry indicating a location in the computer system where a database table can be located.

12. The method of claim 1, wherein the determining step includes determining whether the action affects the ability of a user or application associated with another node to access the object.

13. The method of claim 1 further comprising:

packaging said request at a requesting one of said set of affected nodes;

receiving said packaged request at a processing one of said set of affected nodes;

determining at the processing node an appropriate middleware component from a group of middleware components including a business logic middleware component, a batch application middleware component and a database middleware component for performing the action;

sending the packaged request to the determined appropriate middleware component for performing the action; and sending the results of performing the action from the processing node to the requesting node.

14. The method of claim 13, wherein the one object is a batch application object and the determined appropriate middleware component is said batch application middleware component.

15. The method of claim 13, wherein the one object is a business logic object and the determined appropriate middleware component in said business logic middleware component.

16. The method of claim 13, wherein the one object is a database object and the determined appropriate middleware component is said database middleware component.

17. A computer program embodied in a tangible medium and capable of being read by a computer for performing the method of claim 13.

18. A method according to claim 1, further including maintaining said object configuration information on a management database, and supplying said object configuration information to the nodes from said management database.

19. A method according to claim 18, further including updating said object configuration information maintained on said management database to correspond to said changed object configuration information.

20. A computer program embodied in a tangible medium and capable of being read by a computer for performing the method of claim 1.

21. A computer system for managing the configuration of distributed objects in the computer system, the computer system comprising:

a network including a plurality of nodes;

said nodes including an object locator for maintaining object configuration information defining object accessibility and object locations;

an application for receiving a request to perform an action with respect to one of the objects;

the application determining whether the action may affect a set of the nodes including affecting an ability of said set of nodes to access the one object or affecting a location at which said set of nodes accesses the one object and, in response to determining that the action may affect said set of nodes, notifying said set of affected nodes with a notification message indicating changes to be made to said object configuration information resulting from the action to cause said object configuration information maintained on said set of affected nodes for the one object to be changed in accordance with said notification message; and middleware means for performing the action with respect to the one object in response to receiving the request; said object configuration information is updated dynamically at said affected nodes to reconfigure the one object in the computer network.

22. The computer system of claim 21, wherein the object is a batch application.

23. The computer system of claim 21, wherein the object is business logic.

24. The computer system of claim 21, wherein the object is a database table.

* * * * *

UNITED STATES PATENT AND TRADEMARK OFFICE
CERTIFICATE OF CORRECTION

PATENT NO. : 5,987,497

DATED : November 16, 1999

INVENTOR(S) : Axel J. Allgeier

It is certified that error appears in the above-identified patent and that said Letters Patent is hereby corrected as shown below:

Column 12, line 3, delete "aid" and replace with --said--.

Column 12, line 38, delete "in" and replace with --is--.

Column 14, line 1, add --wherein-- at the beginning of the line.

Signed and Sealed this

Seventh Day of November, 2000

Attest:

Q. TODD DICKINSON

*Attesting Officer*  *Director of Patents and Trademarks*